United States Patent
Salmon

[11] Patent Number: 6,089,805
[45] Date of Patent: Jul. 18, 2000

[54] DEVICE FOR MOUNTING BLIND

[75] Inventor: Bertrand Salmon, Clichy la Garenne, France

[73] Assignee: I.T.W. de France, Beauchamp, France

[21] Appl. No.: 09/271,362

[22] Filed: Mar. 17, 1999

[30] Foreign Application Priority Data

Mar. 17, 1998 [FR] France ................................. 98 03228

[51] Int. Cl.⁷ ................................................. F16B 13/06
[52] U.S. Cl. .............................. 411/45; 411/40; 411/57.1
[58] Field of Search ................................. 411/45, 40, 41, 411/43, 46, 48, 57.1, 39, 2, 3, 5, 65, 66

[56] References Cited

U.S. PATENT DOCUMENTS

| | | | |
|---|---|---|---|
| 4,085,651 | 4/1978 | Koscik | 85/72 |
| 4,757,664 | 7/1988 | Freissle | 52/509 |
| 4,832,547 | 5/1989 | Shiraishi | 411/42 |
| 4,874,276 | 10/1989 | Iguchi | 411/48 |
| 5,085,545 | 2/1992 | Takahashi | 411/45 |
| 5,201,623 | 4/1993 | Benedetti et al. | 411/48 |
| 5,211,519 | 5/1993 | Saito | 411/45 |
| 5,286,152 | 2/1994 | Anderson | 411/45 |
| 5,375,954 | 12/1994 | Eguchi | 411/48 |
| 5,568,675 | 10/1996 | Asami et al. | 24/453 |
| 5,641,255 | 6/1997 | Tanaka | 411/48 |
| 5,846,040 | 12/1998 | Ueno | 411/45 |

FOREIGN PATENT DOCUMENTS

| | | | |
|---|---|---|---|
| 1 254 202 | 5/1961 | France . | |
| 1 291 111 | 9/1962 | France . | |
| 2437308 | 2/1976 | Germany | 411/41 |
| 1 172 462 | 12/1969 | United Kingdom . | |
| 2 216 789 | 10/1989 | United Kingdom . | |

*Primary Examiner*—B. Dayoan
*Assistant Examiner*—Clifford B Vaterlaus
*Attorney, Agent, or Firm*—Lowe Hauptman Gopstein Gilman & Berner

[57] ABSTRACT

Device for mounting blind on an element (57a, 58a) provided with an opening (Ua) having:

a) a first piece (1) having at least one holding lug (4) having a first projecting part and a second projecting part (9) disposed downstream of the said first projecting part in the direction of engagement, b) a second piece (20) provided with a foot having a first portion having a projecting part, a second portion (25) having a projecting part (26) and a breakable part, the first and second pieces being adapted to cooperate so that, once the first piece has been inserted until it abuts in the opening, a driving of the foot with respect to each holding lug produces, when the first projecting part of the first piece and the projecting part of the first portion meet, a breaking of the breakable part which enables the projecting part of the second portion to come up against the second projecting part of the first piece and to bend each holding lug around a first edge (Ra) if the edge is situated downstream of the first projecting part of the first piece in the direction of engagement.

14 Claims, 4 Drawing Sheets

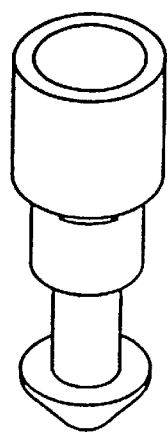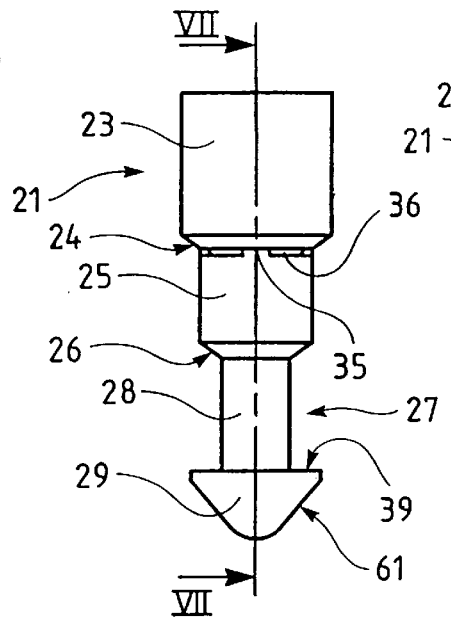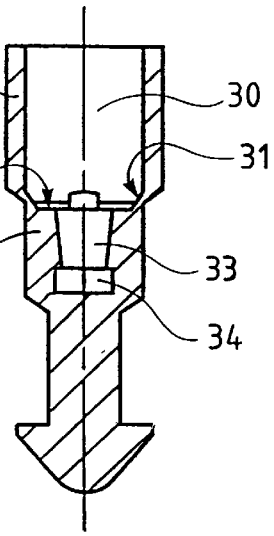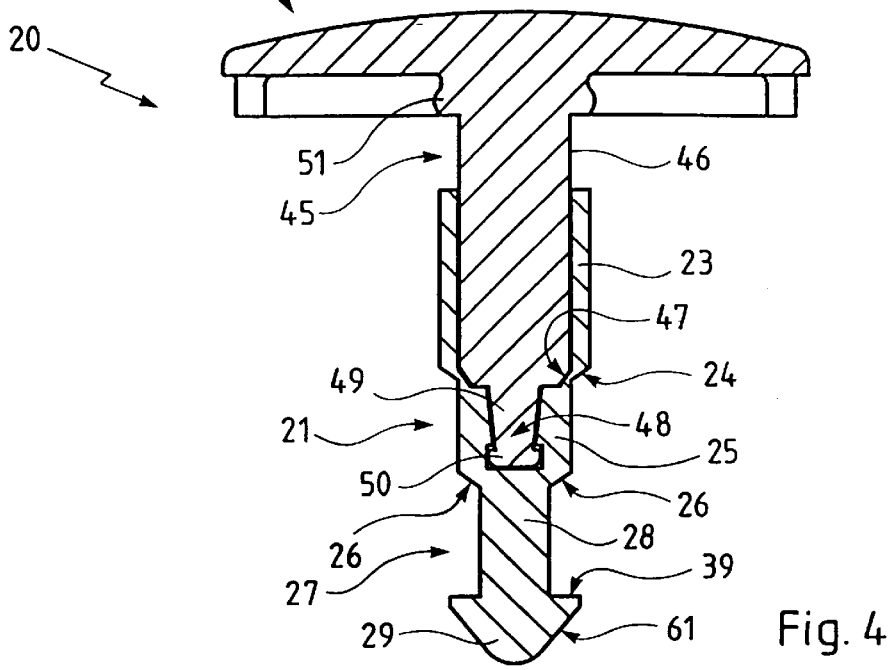
Fig. 5
Fig. 6
Fig. 7
Fig. 4

DEVICE FOR MOUNTING BLIND

BACKGROUND OF THE INVENTION

The invention relates to a device for mounting blind on an element provided with an opening. More precisely, the device of the invention is adapted to be mounted on an element provided with an opening independently of the depth of the said opening.

The current devices do not always give satisfaction, notably if the elements on which the devices are mounted have different thicknesses. Sometimes faulty clamping occurs between the device and the element and in addition the holding forces are very variable according to the thicknesses of the elements. In particular when the device is intended to hold together different pieces forming part of an element: sometimes faulty clamping occurs between the different pieces to be held together and, in addition, the holding forces are very variable according to the thicknesses of the pieces which made up the elements.

In addition the current devices cannot always be easily disconnected.

SUMMARY OF THE INVENTION

The invention aims to remedy these difficulties by proposing a device to be mounted on an element which affords a clamping and a holding force which are almost independent of the thickness of the element.

More precisely the invention concerns a device for mounting blind on an element provided with an opening going from a first space to a second space, the said device being designed to be mounted from the said first space by engagement in the said opening in the direction going from the said first space to the said second space, having:

a) a first piece having at least one holding lug designed to be inserted through the said opening and a stop means designed to come to bear on a stop surface on the said element in order to axially position the said first piece vis-à-vis the said element, each said holding lug being adapted to flex and having a first projecting part and a second projecting part disposed downstream of the said first projecting part in the direction of engagement,
 b) a second piece provided with a foot having a first portion having a projecting part, a second portion having a projecting part and a breakable part situated between the said first portion and the remainder of the second piece,
 the said first and second pieces being adapted to cooperate so that, once the first piece has been inserted until it abuts in the said opening, a driving of the said foot with respect to each said holding lug produces, when the said first projecting part of the said first piece and the said projecting part of the said first portion meet, a bending of each said holding lug around an edge situated at the end of the lateral wall of the said opening which is on the side of the second space, if the said edge is situated upstream of the said first projecting part of the said first piece in the direction of engagement, or, if the said edge is situated downstream of the said first projecting part of the said first piece in the direction of engagement, produces a breaking of the said breakable part which enables the said projecting part of the said second portion to come up against the said second projecting part of the said first piece.

Where the edge is situated upstream of the first projecting part of the first piece in the direction of engagement, after mounting of the device, each holding lug is bent around the edge and thus affords the holding of the device between the said bent holding lugs and the stop means.

Where the edge is situated downstream of the first projecting part of the first piece in the direction of engagement, the breakable part is broken during the mounting of the device, the projecting part of the second portion thus comes up against the second projecting part of the first piece and then, if the edge is situated upstream of the second projecting part of the first piece in the direction of engagement, each holding lug is bent around the edge and thus ensures the holding of the device between the said bent holding lugs and the stop means of the first piece.

In general terms, the device is provided with at least two portions collaborating with corresponding projecting parts in order to hold the said device.

Such a device makes it possible to obtain a clamping of the said device on the element and a holding force which are almost independent of the thickness of the element.

In one embodiment of the device, the driving of the foot with respect to each holding lug takes place in the axial direction.

When the device is mounted on the element, the said device is then applied in the opening in the said element: then a better clamping of the said device on the said element is obtained.

In one embodiment, the remainder of the second piece is adapted to pass through the first portion.

In this embodiment, after the breaking of the breakable part, the driving of the foot is facilitated.

In a preferred embodiment of the device of the invention, the first piece and the second piece allow a predetermined relative locking position and the first piece and the second piece have reversible snapping-in means adapted to cooperate with each other when the first piece and second piece are in the said relative locking position.

In this way the device is locked at the end of the mounting: it is thus strongly and firmly mounted on the element.

The device is preferably produced so that the first piece and the second piece allow a predetermined relative locking position, so that the first piece has at least one first member with a stop surface, so that the second piece has a second member with a stop surface, so that the said stop surface of the said second member is disposed downstream with respect to the stop surface of at least one first member in the direction of engagement when the first piece and the second piece are in the said locking position, and so that the said first and second pieces are adapted, when the second piece is then released with respect to the first piece in the direction opposite to the direction of engagement, so that the stop surface of the said second member comes up against the said stop surface of at least one first member in order to enable the said first piece to be released from the opening in order to withdraw the said device from the said opening.

Such a device thus has means enabling the device to be withdrawn completely from the opening, which can be very appreciable in certain applications.

In the previously disclosed embodiment, the device can be produced so that each first member is a blade.

The second member then advantageously has a ramp whose upstream part in the direction of engagement is connected to the stop surface of the said second member which is recessed with respect to the said ramp, the said members being adapted so that a driving of the said second member with respect to each first member produces, when the said ramp comes up against each first member, an elastic bending of each first member in order to position the stop surface of the said second member beyond the stop surface of each first member.

In this embodiment the mounting of the first piece on the second is facilitated and any withdrawal of the device from the element is effective.

In various embodiments:

the device has two first members, the holding lugs and the first members are arranged as a cylindrical barrel.

The device advantageously has a gripping means adapted to enable the said second piece to be grasped.

Any withdrawal of the second piece is thus facilitated.

Preferably, the device is produced so that the second piece has a head which extends radially beyond the foot and is provided with at least one recess adapted to enable the head to be grasped.

Any withdrawal of the second piece is then particularly convenient.

In a preferred embodiment, the device has several holding lugs having between them one or more symmetry relationships.

In practice it is preferred to produce the second piece in first and second parts moulded in plastic, such that the said first part has a first portion, the second portion and the breakable part, and such that the said second part is adapted to drive the said first part in the direction of engagement.

In this way the device is easily produced. The parts make it possible, in particular, to release the first portion easily from the remainder of the second piece.

The device is then preferably produced so that the first part and the second part have complementary irreversible snapping-in means.

The first part and the second part are joined within the device.

BRIEF DESCRIPTION OF THE DRAWINGS

The disclosure of the invention will now be continued with the description of an example embodiment of the device according to the invention, given below as an illustration and non-limitatively, with regard to the accompanying figures, in which:

FIG. 4 is a view in section of a second piece of the device;

FIG. 5 is a perspective view of a first part of the piece shown in FIG. 4;

FIG. 6 depicts, in side view, the part of the second piece shown in FIG. 5;

FIG. 7 is a view in section marked by VII—VII in FIG. 6;

DETAILED DESCRIPTION OF THE INVENTION

Figure 1:
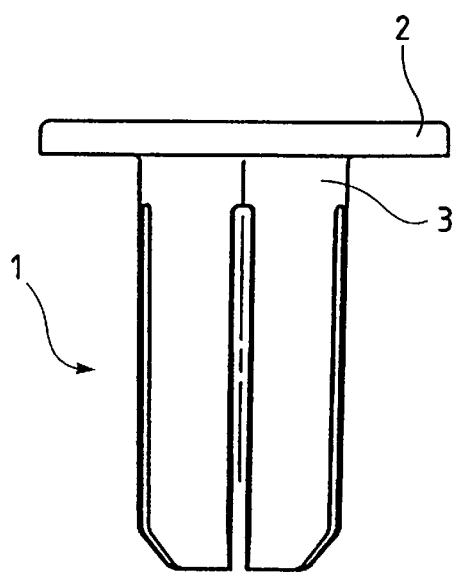
FIG. 1 is an external side view of a first piece of the device.
Figure 2:
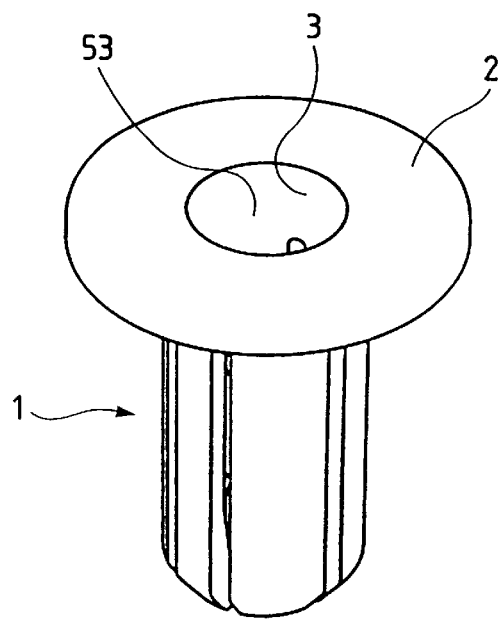
FIG. 2 is a perspective view of the piece of FIG. 1.
Figure 3:
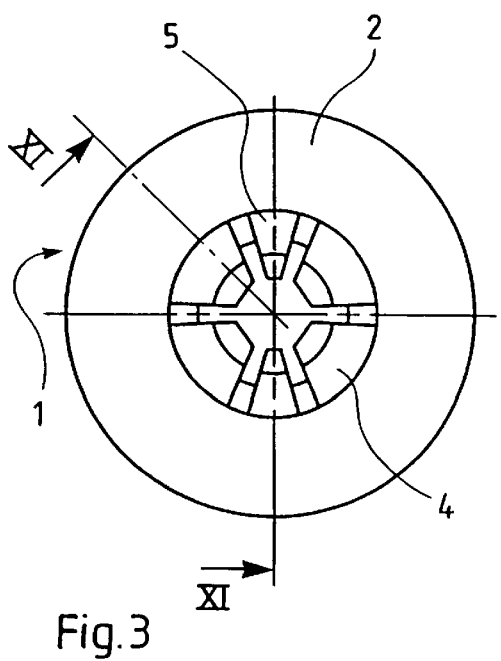
FIG. 3 is a view from below of the piece of FIG. 1.

The first piece 1 (FIGS. 1, 2, 3 and 11) has an annular stop head 2 extended as a sleeve 3. An annular recess 16 is disposed at the inner periphery of the stop head 2. Four holding lugs 4 in the form of a blade and two withdrawal blades 5 are rooted in the sleeve 3. The sleeve 3, the holding lugs 4 and the withdrawal blades 5 have roughly the shape of a barrel. The holding lugs 4 are broader than the withdrawal blades 5 (FIG. 3).

The holding lugs 4 have a first section 6 of constant thickness, a second section 7 of constant thickness greater than that of the first section 6: the transition between these two sections is effected by means of a first projecting part 8 with a thickness decreasing towards the stop head 2. A second projecting part 9 effects the transition between the second section 7 and a third section 10 with a constant thickness greater than that of the second section 7. The third section 10 terminates in a level part 11.

The withdrawal blades 5 have a section 12 of constant thickness which is extended by a section 13 in order to terminate in a level part 14.

The second piece 20 (FIG. 4) has a first part 21 and a second part 40.

The first part 21 of the second piece 20 (FIGS. 5, 6 and 7) as a first cylindrical portion 23, which is hollow and has a bevel 24. The first part 21 also has a second portion 25 which is cylindrical externally and has a bevel 26. The outside diameter of the second portion 25 is smaller in size than the outside diameter of the first portion 24. The bevel 24 projects with respect to the second portion 25. Openings 36 are produced between the first portion 23 and the second portion 25. These openings 36 leave thin breakable parts 35. These breakable parts 35 make it possible, if necessary, as explained below, to separate the first portion 23 and the second portion 25. The second portion 25 is extended in a nose 27. The nose 27 has a barrel 28 and a tip 29. The tip 29 projects radially with respect to the barrel 28, has a plane surface 39 and a side ramp 61 and is rounded at its end. The bevel 26 projects with respect to the barrel 28.

The first portion 23 has a cylindrical cavity 30: the cylindrical cavity 30 has a scalloped part 31 at its bottom end. An annular plate 32 delimits the cylindrical cavity 30. The second portion 25 has a conical cavity 33 broadening out into a cylindrical cavity 34.

Figure 8:
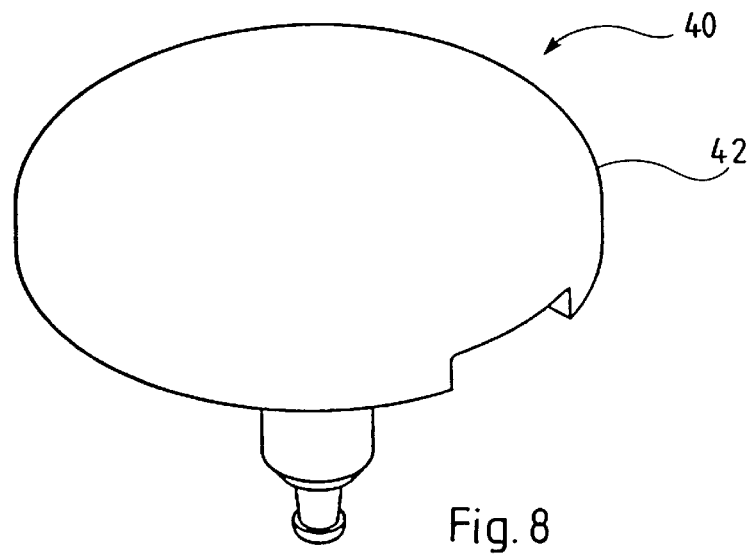
FIG. 8 is a perspective view of a second part of the piece shown in FIG. 4.
Figure 9:
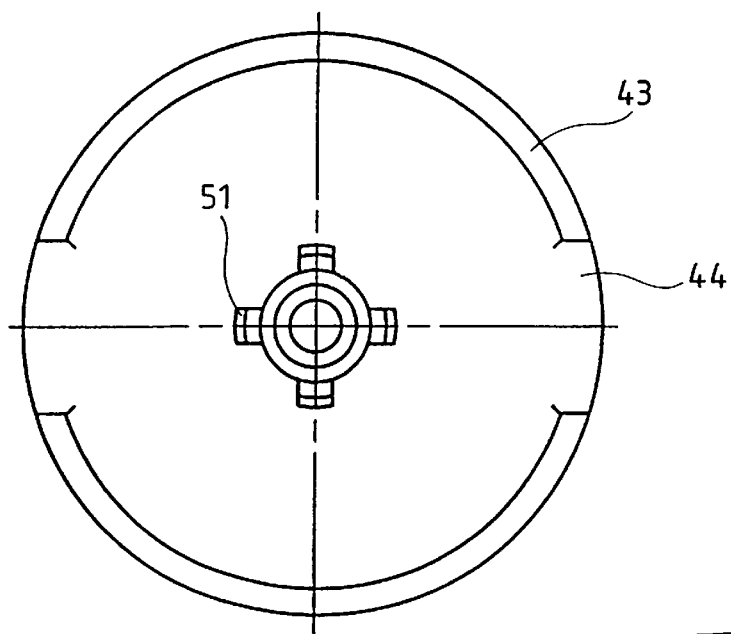
FIG. 9 depicts, in plan view from below, the part shown in FIG. 8.
Figure 10:
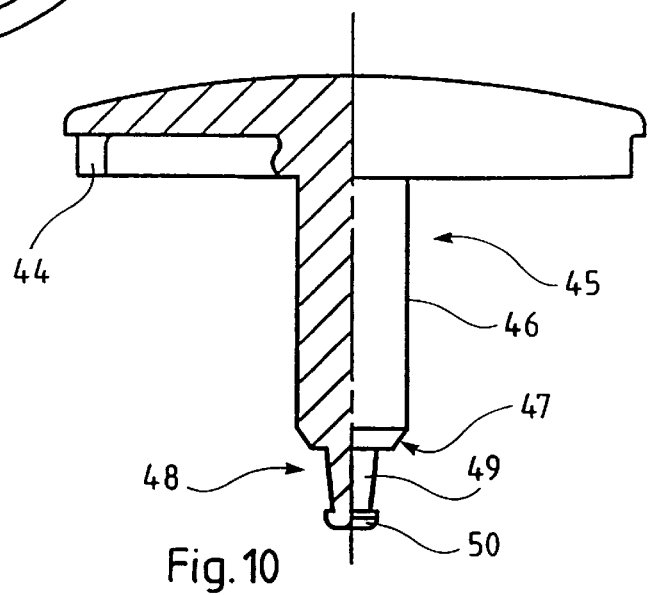
FIG. 10 is a part-section in elevation of the part shown in FIG. 8.

The second part 40 of the second piece 20 (FIGS. 8, 9 and 10) has a substantially plane head 42 which surmounts, on the one hand at its circumference, a rim 43 provided with two openings 44 and, on the other hand at its centre, a foot 45. The foot 45 is disposed transversely to the head 42. The foot 45 has a barrel 46 with a bevel 47 which surmounts a nose 48. The foot 45 has four rounded snubs 51, projecting radially and adapted to be housed with force in the recess 16. A shoulder 52 extends the bevel 47. The nose 48 has on the one hand a conical part 49 and on the other hand a stud 50 projecting radially and rounded at its end.

The first piece 1 of the device and the two parts 21 and 40 of the second piece are produced from moulded plastic.

The stud 50 on the nose 48 can engage in the cylindrical cavity 30, can slide with force along the inclined walls of the conical cavity 33 and come to be housed in the cavity 34. By these means, the first part 21 of the second piece 20 and the second part 40 of the second piece 20 can be irreversibly connected by snapping-in: in this configuration, the conical part 49 of the nose 48 (or respectively the barrel 46) substantially fits the internal walls of the conical cavity 33 (or respectively of the cylindrical cavity 30) (FIG. 4). The bevel 47 bears on the scalloped part 31 and the shoulder 52 comes into abutment on the annular plate 32.

Figure 11:
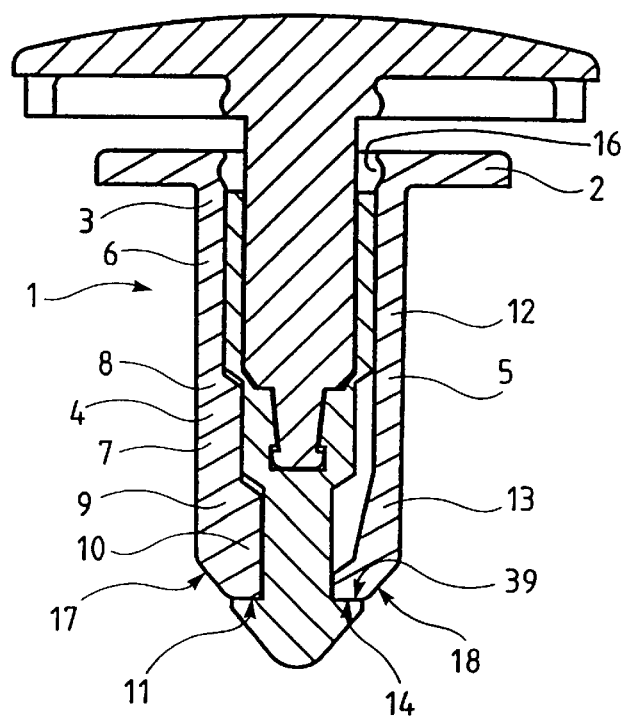
FIG. 11 is a view in section along XI—XI of the entire device which is ready for use and which includes the two pieces in FIGS. 1 and 4.

The radial dimensions of the nose 27 are smaller than a space 53 available between the first sections 6 and the sections 12. The nose 27 can engage in the space 53. The first part 21 of the second piece 20 mounted on the second part 40 of the second piece 20 can be mounted in the first piece 1: in fact, after the nose 27 passes into the space 53, the nose 27 comes to bear on the first projecting part 8 and causes the holding lug 40 and the withdrawal blades 5 to flex, then slides along the second section 7, then comes to bear on the second projecting part 9, then slides along the third section 10 whilst pressing on the withdrawal blade 5 and finally, when the nose 7 projects beyond the level parts 11 and 14, the holding lugs 4 and the withdrawal blades 5 tighten on the barrel 28 (FIG. 11): in this configuration the level parts 11 and 14 are opposite the nose 27; the first portion 23 collaborates with the first section 6; the bevel 24 fits the first projecting part 8; the second portion 25 fits the second section 7; the bevel 26 fits the second projecting part 9; the barrel 28 fits the third section 10 and the withdrawal blade 5. FIG. 11 shows how the bevelled parts 17 and 18 have, with the tip 29, a pointed shape adapted to engage more easily in an opening.

In this configuration the device is ready for use.

It will now be explained how this device is used.

Figure 12:
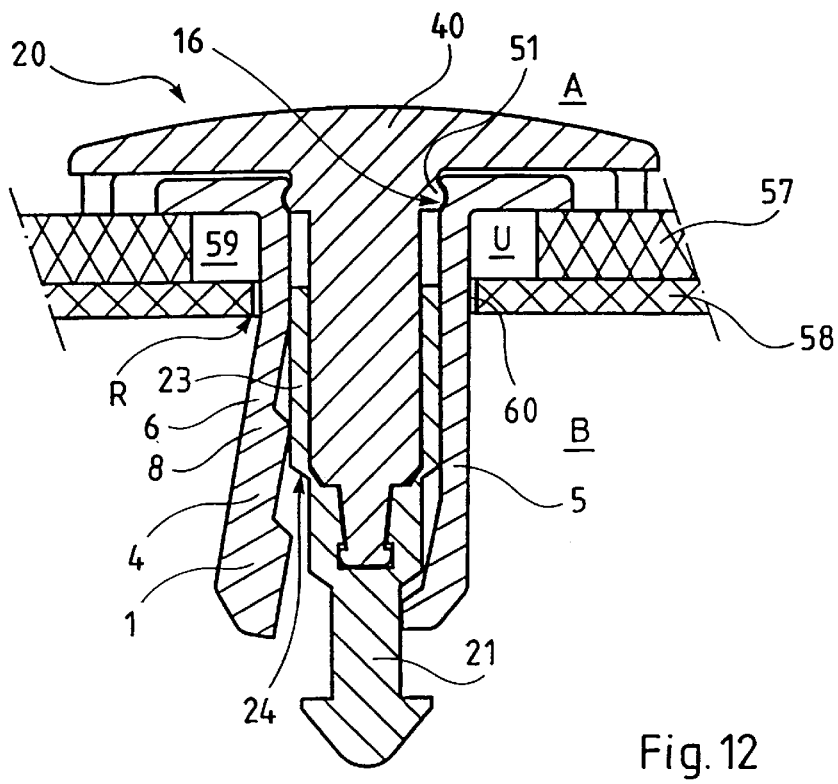
FIG. 12 is a similar view where the device is maintaining a superimposition of thin plates.
Figure 13:
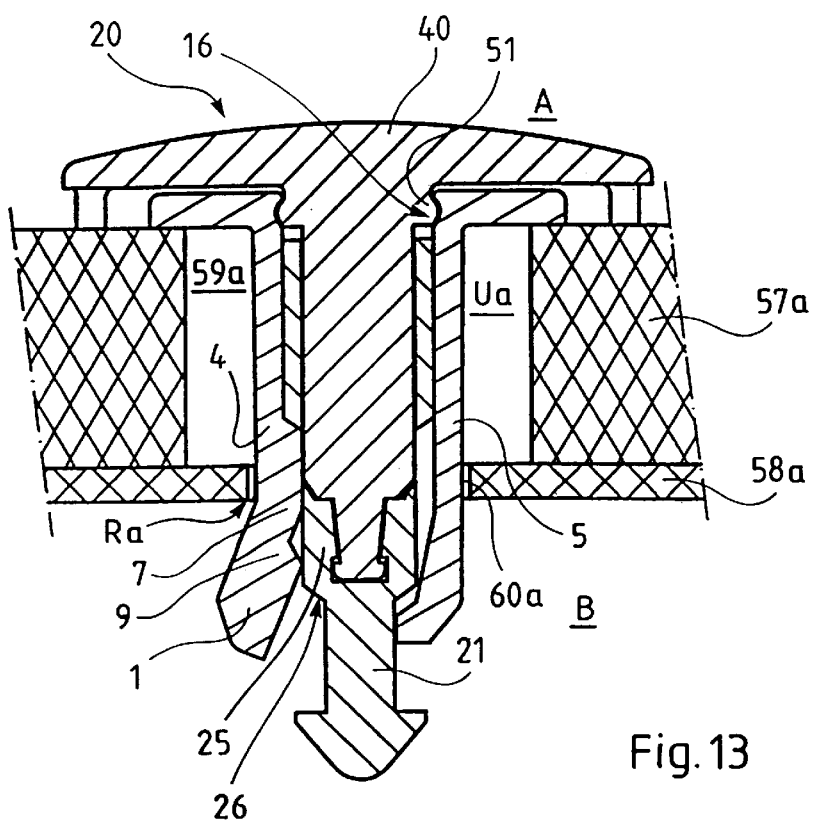
FIG. 13 is identical view but with a superimposition of thick plates.

A superimposition of plates provided with aligned apertures is considered (FIGS. 12 and 13). The superimposition of plates includes a top plate 57 (respectively 57*a*) provided with an aperture 59 (respectively 59*a*) and a bottom plate 58 (respectively 58*a*) provided with an aperture 60 (respectively 60*a*) in FIG. 12 (respectively FIG. 13). The superimposition of plates defines two spaces denoted respectively space A and space B. The apertures 59 and 60 (respectively 59*a* and 60*a*) produce an opening U (respectively Ua) going from space A to space B. An edge R (respectively Ra) is defined at the end of the lateral wall of the opening U (respectively Ua) on the same side as the space B. The holding lugs 4 and control blades 5 are approximately against the edge R (respectively Ra).

The first thing is to axially engage the device in the opening U (respectively Ua) until the stop head 2 rests on the top plate 47 (respectively 47*a*). Then the head 42 is pressed on, which presses in the second part 40 of the second piece 20. Two cases can arise according to the thickness of the superimposition of plates.

When the superimposition of plates is not very thick, that is to say, more precisely, when the edge R is situated above the first projecting part 8 (FIG. 12), the pressing in of the second part 40 of the second piece 20 causes the first part 21 of the second piece 20 to be pushed in, and the bevel 24 of the first portion 23 bears on the first projecting part 8, which causes the bending of the holding lug 40 at the edge R: the superimposition of plates is held between the stop head 2 and the bent holding lug 4.

When the superimposition of plates is thicker, that is to say, more precisely, when the edge Ra is situated below the first projecting part 8 and above the second projecting part 9 (FIG. 13), the pressing in of the second part 40 of the second piece 20 causes the breakage of the breakable parts 35 and the bevel 26 of the second portion 25 bears on the second projecting part 9, which causes the bending of the holding lug at the level of the edge Ra: the superimposition of plates is held between the stop head 2 and bent holding lug 4.

It can be seen, in the two cases, that the bevels of the different portions and the corresponding projecting parts come into action at different heights: this makes it possible to obtain more even holding forces and more regular riveting forces.

Finally, in the two cases, the snubs 51 forcibly engage in the recess 16 and lock the holding device.

It will now be explained how the device can be withdrawn. Starting from a device mounted as depicted in FIG. 12 or 13, an instrument of the knife or screwdriver or rod type is engaged in one of the openings 44 and is raised in order to pull on the head 40, upwards in FIGS. 12 or 13. The snubs 51 disengage from the recess 16. The nose 48 drives the barrel 28 and the nose 27 until the plane surface 39 of the nose 27 comes into contact with the level part 14 of one of the withdrawal blades 4. Continuing to pull on the head 40, the holding lugs 4 straighten up by cooperation with the edge R (respectively Ra), and finally, by continuing, the device is completely disengaged.

The invention has been illustrated with a device having two portions 23 and 25 collaborating with two projecting parts 8 and 9. In a variant which is not shown, the device has more than two portions collaborating with corresponding projecting parts.

A device adapted to hold several elements together has been presented in order to illustrate one example embodiment of the invention. It is clear that the invention can apply to very many other types of device: such as for example a device for filling in an opening or a device carrying an element intended to be fixed to a wall.

I claim:

1. Device for mounting blind on an element (57, 58; 57*a*, 58*a*) provided with an opening (U; Ua) going from a first space (A) to a second space (B), the said device being designed to be mounted from the said first space by engagement in the said opening in the direction going from the said first space to the said second space, having:

a) a first piece (1) having at least one holding lug (4) designed to be inserted through the said opening and a stop means (2) designed to come to bear on a stop surface on the said element in order to axially position the said first piece vis-à-vis the said element, each said holding lug being adapted to flex and having a first projecting part (8) and a second projecting part (9) disposed downstream of the said first projecting part in the direction of engagement, b) a second piece (20) provided with a foot having a first portion (23) having a projecting part (24), a second portion (25) having a projecting part (26) and a breakable part (35) situated between the said first portion and the remainder of the second piece, the said first and second pieces being adapted to cooperate so that, once the first piece has been inserted until it abuts in the said opening, a driving of the said foot with respect to each said holding lug produces, when the said first projecting part of the said first piece and the said projecting part of the said first portion meet, a bending of each said lug around an edge (R; Ra) situated at the end of the lateral wall of the said opening which is on the side of the second space, if the said edge is situated upstream of the said first projecting part (8) of the said first piece in the direction of engagement, or, if the said edge is situated downstream of the said first projecting part (8) of the said first piece in the direction of engagement, produces a breaking of the said breakable part which enables the said projecting part of the said second portion to come up against the said second projecting part of the said first piece.

2. Device according to claim 1, characterised in that said device is produced so that the driving of the foot with respect to each holding lug takes place in the axial direction.

3. Device according to claim 1, characterised in that the remainder of the second piece is adapted to pass through the first portion (23).

4. Device according to claim 1, characterised in that the first piece and the second piece allow a predetermined relative locking position and in that the first piece and the second piece have reversible snapping-in means (16, 51) adapted to cooperate with each other when the first piece and second piece are in the said relative locking position.

5. Device according to claim 1, characterised in that the first piece and the second piece allow a predetermined relative locking position, in that the first piece has at least one first member with a stop surface (14), in that the second piece has a second member with a stop surface (11), in that the said stop surface of the said second member is disposed downstream with respect to the stop surface of at least one first member in the direction of engagement when the first piece and the second piece are in the said locking position, and in that the said first and second pieces are adapted, when the second piece is then released with respect to the first piece in the direction opposite to the direction of engagement, so that the stop surface of the said second member comes up against the said stop surface of at least one first member in order to enable the said first piece to be released from the opening in order to withdraw the said device from the said opening.

6. Device according to claim 5, characterised in that each first member is a blade.

7. Device according to claim 6, characterised in that the said second member has a ramp (61) whose upstream part in the direction of engagement is connected to the stop surface of the said second member which is recessed with respect to the said ramp, the said members being adapted so that a driving of the said second member with respect to each first member produces, when the said ramp comes up against each first member, a bending of each first member in order to position the stop surface of the said second member beyond the stop surface of each first member.

8. Device according to claim 6, characterised in that said device has four first members.

9. Device according to claim 6, characterised in that the holding lugs and the first members are arranged as a cylindrical barrel.

10. A device according to claim 1, characterised in that the second piece has a gripping means adapted to enable the said second piece to be grasped in order to withdraw the said second piece.

11. Device according to claim 1, characterised in that the second piece has a head (42) which extends radially beyond the foot and is provided with at least one recess (44) adapted to enable the head to be grasped.

12. Device according to claim 1, characterised in that said device has several holding lugs having between them one or more symmetry relationships.

13. Device according to claim 1, characterised in that the second piece (20) has first and second parts moulded in plastic, in that the said first part (21) includes the first portion, the second portion and the breakable part, and in that the said second part (40) is adapted to drive the said first part in the direction of engagement.

14. Device according to claim 13, characterised in that the first part and the second part have complementary irreversible snapping-in means.

* * * * *